(No Model.)
J. J. E. PHILIPS.
ELECTRIC SUBWAY.
No. 521,125. Patented June 5, 1894.
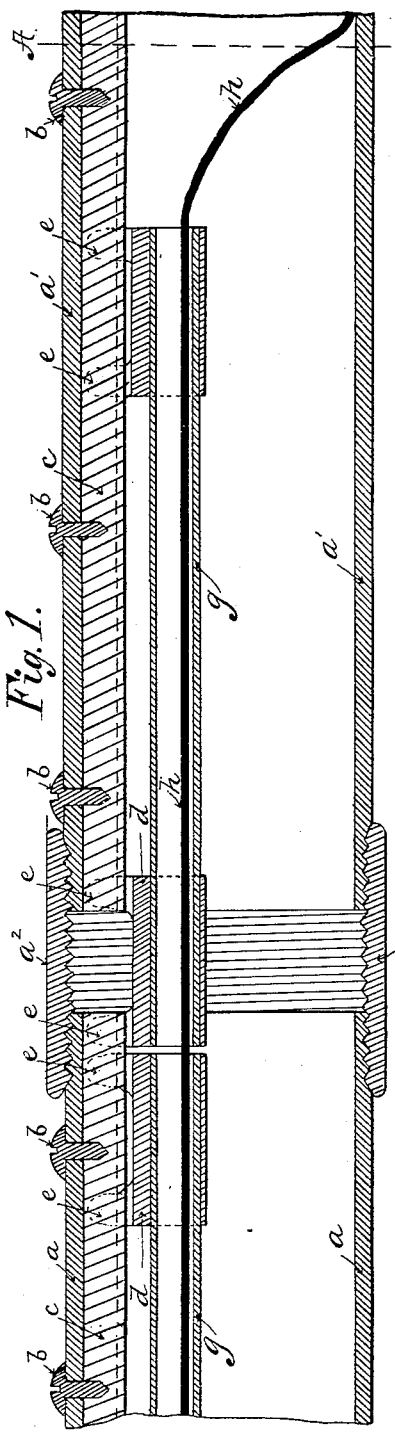
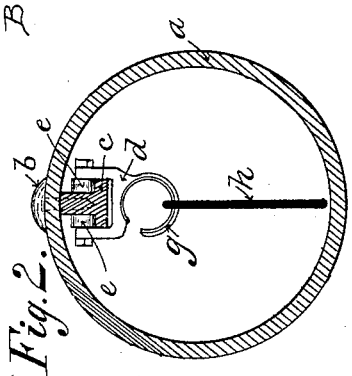
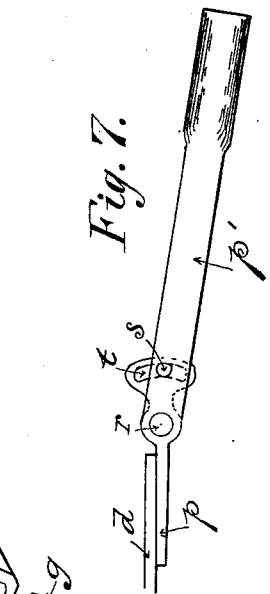
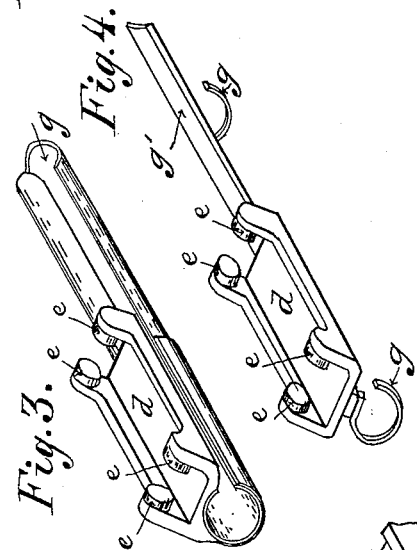
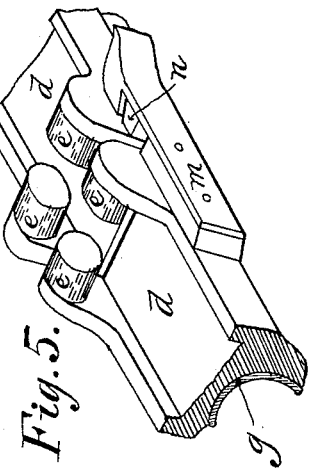
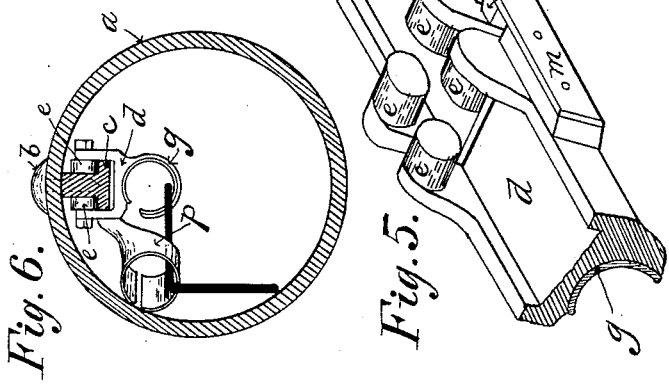
Witnesses.
Catharine Georgi.
Alfred W. Van Zee.
Inventor
James J. E. Philips
by his Attorneys
Baldwin, Davidson & Wight ID states.

UNITED STATES PATENT OFFICE.

JAMES J. E. PHILIPS, OF BROOKLYN, NEW YORK, ASSIGNOR TO THE EMPIRE CITY SUBWAY COMPANY, LIMITED.

ELECTRIC SUBWAY.

SPECIFICATION forming part of Letters Patent No. 521,125, dated June 5, 1894.

Application filed August 29, 1893. Serial No. 484,332. (No model.)

*To all whom it may concern:*

Be it known that I, JAMES J. E. PHILIPS, a citizen of the United States, residing in Brooklyn, in the county of Kings and State of New York, have invented certain new and useful Improvements in Methods of and Apparatus for Laying Wires or Cables in the Ducts or Conduits of Subways, of which the following is a specification.

Heretofore usually wires and cables have been laid in the conduits or ducts of subways by means of a drawing in wire, which hauls the conductor or cable into the conduit. It has also been proposed to provide in the duct or conduit and upon the upper wall thereof a track or way upon which is supported a trolley or car that traverses the conduit or conduit section, and draws into it the attached conductor or cable. In both of the above mentioned methods, there is always injurious friction between the cable or conductor which is being drawn in and the walls of the conduit, or between the cable or conductor being drawn in and the conductors or cables already laid in the conduit. These objections have been overcome to some extent by a method in which is employed a continuous flexible chain carrier or roller bed to which the cable or conductor is attached and upon which it is supported and carried through the conduit section and from which it is separated by drawing the roller bed longitudinally from under the conductor or cable. This roller bed is flexible throughout its length, and all the parts thereof are permanently secured together. It is drawn into and through the conduit or conduit section by means of a rope, and the rope and flexible bed are wound up on a reel.

The primary object of my invention is to lay conductors or cables in a duct or conduit without undue or injurious friction to the conductor or cable being laid, or to the conductors or cables already laid, and without the necessity for the use of complicated and expensive supporting mechanism and apparatus for operating it. I also have in view the expeditious handling of the conductors or cables which end I accomplish by the use of carriers or supporters which are light and easily moved from place to place, may be quickly inserted into and withdrawn from the conduit or duct, and may readily be attached to and separate from the conductor or cable.

In the accompanying drawings, Figure 1 represents a vertical longitudinal central section of a duct or conduit and sections of a conveyer or carrier supporting the cable or conductor, and mounted to move on a track or way within the conduit. Fig. 2 is a vertical transverse section on the line A B of Fig. 1. Fig. 3 is a perspective view of one of the carriage sections or trolleys shown in Figs. 1 and 2. Fig. 4 is a similar view of a modified form of the carriage. Fig. 5 is a perspective view of parts of two adjacent trolleys showing particularly fastening devices by which they may be connected and disconnected. Fig. 6 is a vertical transverse section similar to Fig. 2, but showing also means for distributing or laying the conductor or cable in any desired portion of the conduit. Fig. 7 is a detail plan view of the devices shown in Fig. 6 for laying the cable or conductor.

The drawings show a conduit or duct consisting of tubular sections $a\ a'$ connected at their ends by a coupling $a^2$. A double flanged rail or inverted T-shaped way $c$ is secured longitudinally and centrally to the inner upper side of the conduit by bolts, rivets or other suitable means $b$. A conveyer section, car or trolley $d$ preferably having rollers $e$ is adapted to traverse the flanges of the way or rail $c$. To the trolley is secured a supporter $g$ consisting preferably of a hook, loop or longitudinally slotted tube, in which the conductor or cable is laid and by which it is suspended.

Figs. 1, 2, 3 and 6 show the supporter in the form of a tube secured to the under side of the trolley, and slotted longitudinally on one side.

Fig. 4 shows narrow hooks $g$ beneath the trolley and a bar $g'$ extending longitudinally therefrom.

Fig. 6 shows a slotted tube or hook $p$ projecting laterally from the trolley to lay the conductor or cable on one side of the duct or conduit, and Fig. 7 shows the supporter $p'$ as connected by a pivot $r$ with an arm $p$ on the trolley $d$, the construction being such that it may be moved laterally relatively to the trolley, its range of movement being controlled by a set screw or pin s working in a slot t. The carriage or conveyer sections are provided with devices by which they may be readily connected and disconnected from each other. Preferably I employ interlocking spring catches m n as shown in Fig. 5. In each instance the supporters g p have lateral openings permitting of the ready insertion and withdrawal of the conductor or cable therefrom.

By my improvements I am enabled to lay wires or cables in the main ducts of subways and in the branches therefrom, and in doing so I proceed as follows: One end of the conductor or cable is attached to a carrier or car in a man-hole or other opening of the conduit or duct and is pushed or drawn along the way c into the conduit section. Another carrier or car is then mounted on the way and the conductor or cable is passed through the lateral opening thereof, and laid upon it. This car or conveyer is then pushed into the conduit and moved forward carrying with it the car or conveyer which was first inserted. In like manner successive cars or conveyers are mounted on the way and connected with the cable or conductor and moved into the conduit section. When the front car or conveyer reaches the opposite end of the conduit, the cable or conductor may be separated from the carriers in the following manner: Each section of the carrier or conveyer may in turn be drawn out of the conduit and detached, the cable or wire dropping into place at the rear end of the series of carriers as the sections are detached. When the last carrier or conveyer is removed, the conductor or cable is laid in place throughout the length of the conduit section.

The method of withdrawing the cable from the carriers may be varied. It may be separated at the front end of the conduit section by removing the carriers at this end and withdrawing them separately, the conductor or cable being deposited in the conduit at the opposite end of the section.

It will be remembered that each carriage or conveyer is provided with detachable connections so that they may be readily drawn from one end of the conduit section to the other by manipulating the conveyer section nearest the operator, or by the use of a cord or rope. The conveyer sections, while having connections between them, which are somewhat flexible are themselves stiff and rigid so that they may be pushed back and forth and move the other sections connected therewith without buckling or doubling up. By this arrangement, the use of a hauling rope is not necessary as the conveyer sections may be pushed forward as the cable is being laid and may be either pushed or pulled forward in series, when the cable is being withdrawn. By the use of the laterally projecting supporter t, shown in Figs. 6 and 7 I am enabled to deposit the conductor or cable on one side of the conductor or duct or any desired place therein, and by means of the adjusting devices, the conductors or cables may be arranged with any desired relation to each other.

I claim as my invention—

1. The method herein described of laying conductors or cables in ducts or conduits, which consists in inserting the conductor or cable into the conduit, attaching it to a supporting carriage or conveyer, moving said conveyer into the conduit, then successively attaching the conductor or cable to a number of carrier sections and moving them successively into the conduit until the conductor is supported throughout the length thereof, and then removing the conductor or cable from the carriers and separately removing the carriers from the conduit.

2. The method herein described of laying conductors or cables in ducts or conduits, which consists in inserting a carrier which supports a cable into the duct or conduit, moving said carrier into the duct or conduit, then attaching the conductor to another carrier or carrier section, and moving said carrier with the first mentioned carrier into the conduit, then successively attaching it to other carriers or carrier sections, and moving them into the conduit, and then moving the conductor laterally from each carrier, and separately removing the carriers from the conduit.

3. The combination of a conduit, a rail or way in the upper part thereof, and a series of carriers or conveyer sections supported on the rail or way, and in which the cable or conductor may be readily mounted and from which it may be readily detached.

4. The combination, substantially as set forth, of a duct, conduit or conduit section, and a series of carriers or conveyer sections detachably connected together and adapted to traverse and support the wire or cable throughout the length of the conduit.

5. The combination of a conduit, a carrier adapted to traverse it, and which is provided with a lateral opening or openings through which the conductor or cable may be passed to mount it on or detach it from the carrier.

6. The combination, substantially as set forth, of a conduit and a series of carriers or carrier sections, adapted to traverse the conduit, and having detachable connections with each other, and lateral openings through which the conductor or cable may be moved.

7. The combination, substantially as set forth, of a conduit, a carrier adapted to traverse it, composed of stiff or rigid sections detachably connected together and provided with openings through which the conductor or cable may be moved to mount it on or detach it from the carriers.

8. The combination of a conduit, a rail or way arranged longitudinally therein, and a movable carriage or conveyer adapted to support the cable or conductor, and having a projecting support for laying the cable or conductor in the desired position, relatively to other conductors in the conduit.

9. A carriage or conveyer for laying a cable or conductor in a conduit, comprising a series of cars, carriers or trolleys detachable connections uniting them, and laterally slotted supports carried thereby.

10. The combination, substantially as set forth, of a conduit, a rail or way therein, a carrier, conveyer or trolley adapted to traverse the way, and adjustable devices carried by the conveyer to vary the line of deposit of the conductor or cable.

11. The combination of a conduit, a longitudinally flanged rail or way secured thereto, a series of cars or conveyers provided with rollers, and adapted to traverse the rail or way, detachable connections between the cars, and longitudinal openings in the cars or conveyers through which the wire or cable may be moved.

JAMES J. E. PHILIPS.

Witnesses:
HUGH McLAREN,
CLEMENT I. WALKER.